United States Patent
Schuttenberg

(10) Patent No.: US 9,311,247 B1
(45) Date of Patent: Apr. 12, 2016

(54) METHOD AND APPARATUS FOR DETECTING PATTERNS OF MEMORY ACCESSES IN A COMPUTING SYSTEM WITH OUT-OF-ORDER PROGRAM EXECUTION

(71) Applicant: Marvell International Ltd., Hamilton (BM)

(72) Inventor: Kim Schuttenberg, Gilbert, AZ (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 126 days.

(21) Appl. No.: 13/847,156

(22) Filed: Mar. 19, 2013

Related U.S. Application Data

(60) Provisional application No. 61/613,040, filed on Mar. 20, 2012.

(51) Int. Cl.
*G06F 12/08* (2006.01)
*G06F 9/30* (2006.01)

(52) U.S. Cl.
CPC ........ *G06F 12/0862* (2013.01); *G06F 9/30043* (2013.01); *G06F 9/30047* (2013.01)

(58) Field of Classification Search
None
See application file for complete search history.

(56) References Cited

U.S. PATENT DOCUMENTS

| | | | |
|---|---|---|---|
| 5,774,358 A | 6/1998 | Shrote | |
| 5,996,068 A | 11/1999 | Dwyer et al. | |
| 6,055,650 A | 4/2000 | Christie | |
| 6,163,839 A | 12/2000 | Janik et al. | |
| 6,430,680 B1 * | 8/2002 | Burky et al. | 712/225 |
| 6,976,147 B1 * | 12/2005 | Isaac et al. | 711/205 |
| 7,496,735 B2 * | 2/2009 | Yourst et al. | 712/218 |
| 7,774,578 B2 | 8/2010 | Keltcher | |
| 8,447,911 B2 * | 5/2013 | Burger | G06F 9/3824 711/5 |
| 2003/0163671 A1 | 8/2003 | Gschwind et al. | |
| 2004/0024993 A1 | 2/2004 | Parthasarathy | |
| 2004/0133747 A1 | 7/2004 | Coldewey | |
| 2005/0125632 A1 | 6/2005 | Alsup et al. | |
| 2006/0179239 A1 | 8/2006 | Fluhr et al. | |
| 2006/0248280 A1 | 11/2006 | Al-Sukhni | |
| 2006/0248281 A1 * | 11/2006 | Al-Sukhni | G06F 9/383 711/137 |
| 2007/0118724 A1 | 5/2007 | Patel | |

(Continued)

OTHER PUBLICATIONS

Office Action issued Mar. 25, 2015 in related/corresponding U.S. Appl. No. 14/011,152, filed Aug. 27, 2013.

(Continued)

*Primary Examiner* — Christian P Chace
*Assistant Examiner* — Tracy A Warren

(57) ABSTRACT

A method for detecting patterns of memory accesses in a computing system with out-of-order program execution is provided. The method comprises identifying a first memory operation instruction that is part of a memory stream that would benefit from memory prefetches, marking with program order a plurality of other memory operation instructions prior to execution that are part of the same memory stream as the first memory operation instruction while the plurality of other memory operation instructions are in program order, and, subsequent to out of program order execution of at least two of the plurality of marked memory operation instructions but before execution of all of the plurality of marked memory operation instructions, determining an expected offset value between memory addresses to be accessed by consecutively marked memory operation instructions using the marked memory operation instructions that have executed.

13 Claims, 14 Drawing Sheets

(56) References Cited

U.S. PATENT DOCUMENTS

| | | | |
|---|---|---|---|
| 2008/0288751 A1* | 11/2008 | Kocev | 712/207 |
| 2010/0293339 A1 | 11/2010 | Arimilli et al. | |
| 2011/0131380 A1 | 6/2011 | Rallens et al. | |
| 2011/0173397 A1 | 7/2011 | Boyle et al. | |
| 2012/0166733 A1 | 6/2012 | Cherukuri et al. | |

OTHER PUBLICATIONS

Steven P. Vanderwiel and David J. Lilja. 2000, Data prefetch mechanisms. ACM Comput. Surv. 32, 2 (Jun. 2000) 174-199. DOI=10.1145/358923.358939 <http://doi.acm.org/10.1145/358923.358939>.

Office Action dated May 11, 2015 issued in related/corresponding U.S. Appl. No. 13/893,871, filed May 14, 2013.

Final Rejection mailed Jul. 20, 2015 from related/corresponding U.S. Appl. No. 14/011,152, filed Aug. 27, 2013.

Office Action dated Feb. 3, 2016 from related/corresponding U.S. Appl. No. 14/011,152, filed Aug. 27, 2013.

* cited by examiner

METHOD AND APPARATUS FOR DETECTING PATTERNS OF MEMORY ACCESSES IN A COMPUTING SYSTEM WITH OUT-OF-ORDER PROGRAM EXECUTION

CROSS-REFERENCE TO RELATED APPLICATION

The present application claims priority from U.S. Provisional Application No. 61/613,040, filed on Mar. 20, 2012, entitled "Methods For Detecting The Stride Of A Stream Of Memory Operations In An Out Of Order Execution Pipe," which is hereby incorporated into the present application by reference.

TECHNICAL FIELD

The technology described herein relates generally to microprocessor logic design.

BACKGROUND

Data prefetching may enhance the performance of a microprocessor in various circumstances. Data prefetching hardware may attempt to detect patterns of data access and prefetch data that is likely to be needed based upon a detected pattern such as the stride of a stream of memory operations. Out-of-order program instruction execution may also enhance the performance of a microprocessor in various circumstances. Out-of-order execution of some instructions, however, may complicate pattern detection for data prefetching hardware.

SUMMARY

In accordance with the teachings provided herein, systems and methods are provided for detecting patterns of memory accesses in a computing system with out-of-order program execution. In one example, provided is a method comprising identifying a first memory operation instruction that is part of a memory stream that would benefit from memory prefetches, and marking, with program order, a plurality of other memory operation instructions prior to execution of the plurality of other memory operation instructions, wherein the plurality of other memory operation instructions are part of the same memory stream as the first memory operation instruction, and wherein the plurality of other memory operation instructions are marked while the plurality of other memory operation instructions are in program order. The method further provides, subsequent to out of program order execution of at least two of the plurality of marked memory operation instructions but before execution of all of the plurality of marked memory operation instructions, determining an expected offset value between memory addresses to be accessed by consecutively marked memory operation instructions using the marked memory operation instructions that have executed and prefetching data from non-cache memory for storage in a cache memory for other memory operating instructions of the same memory stream that have yet to execute, wherein the data prefetched for storage in the cache memory is determined based on the expected offset value between memory addresses.

These aspects and other embodiments may include one or more of the following features. Prefetching data from non-cache memory for storage in a cache memory may comprise predicting the address of data to be accessed by a marked memory operation instruction that has not yet executed using the expected offset value and fetching the data for storage in cache memory before the marked memory operation instruction that has not yet executed executes. The method may further comprise determining that another memory operation instruction that is part of the same memory stream as the first memory operation instruction has not already been identified. Determining that another memory operation instruction that is part of the same memory stream as the first memory operation instruction has not already been identified may comprise creating a record in a structure to record characteristics of the first memory operation instruction. The method may further comprise determining that a record for another memory operation instruction in the same stream has not been recorded in the structure. The method may further comprise assigning a counter for the first memory operation instruction. Marking with program order may comprise associating an incrementing count value to the other memory operation instructions. Determining an expected offset value between memory addresses to be accessed by consecutively marked memory operation instructions using the marked memory operation instructions that have executed may comprise retrieving a memory address and a count value associated with each of the two executed memory operation instructions and subtracting the memory address of one of the two executed memory operation instructions from the other if the two executed memory operation instructions are marked as having been in consecutive program order. The method may further comprise using a different set of memory operation instructions if the two executed memory operation instructions are not marked as having been in consecutive program order. Determining an expected offset value between memory addresses to be accessed by consecutively marked memory operation instructions using the marked memory operation instructions that have executed may alternatively comprise retrieving a memory address and a count value associated with each of the two executed memory operation instructions, subtracting the memory address of one of the two executed memory operation instructions from the other, and dividing the subtraction results by the program order difference between the two executed memory operation instructions. Determining an expected offset value between memory addresses to be accessed by consecutively marked memory operation instructions using the marked memory operation instructions that have executed may also comprise tracking several historical operations in a history array by recording accessed memory addresses for several memory operation instructions, indexing the history array using count values, and detecting patterns in the history array.

In accordance with another example, a computer system that can execute program instructions out-of-order comprising prefetching hardware is provided. The prefetching hardware is configured to identify a first memory operation instruction that is part of a memory stream that would benefit from memory prefetches and mark, with program order, a plurality of other memory operation instructions prior to execution of the plurality of other memory operation instructions, wherein the plurality of other memory operation instructions are part of the same memory stream as the first memory operation instruction, and wherein the plurality of other memory operation instructions are marked while the plurality of other memory operation instructions are in program order. The prefetching hardware is further configured to, subsequent to out of program order execution of at least two of the plurality of marked memory operation instructions but before execution of all of the plurality of marked memory operation instructions, determine an expected offset value between memory addresses to be accessed by consecutively marked memory operation instructions using the marked memory operation instructions that have executed and prefetch data from non-cache memory for storage in a cache memory for other memory operating instructions of the same memory stream that have yet to execute, wherein the data prefetched for storage in the cache memory is determined based on the expected offset value between memory addresses.

These aspects and other embodiments may include one or more of the following features. The prefetching hardware may be further configured to predict the address of data to be accessed by a marked memory operation instruction that has not yet executed using the expected offset value and fetch the data for storage in cache memory before the marked memory operation instruction that has not yet executed executes. The prefetching hardware may be further configured to associate an incrementing count value to the other memory operation instructions. The prefetching hardware may be further configured to retrieve a memory address and a count value associated with each of the two executed memory operation instructions, and subtract the memory address of one of the two executed memory operation instructions from the other if the two executed memory operation instructions are marked as having been in consecutive program order. The prefetching hardware may be further configured to use a different set of memory operation instructions if the two executed memory operation instructions are not marked as having been in consecutive program order. The prefetching hardware may be further configured to retrieve a memory address and a count value associated with each of the two executed memory operation instructions, subtract the memory address of one of the two executed memory operation instructions from the other, and divide the subtraction results by the program order difference between the two executed memory operation instructions. The prefetching hardware may be further configured to track several historical operations in a history array by recording accessed memory addresses for several memory operations, index the history array using count values, and detect patterns in the history array. The prefetching hardware may be further configured to command a memory system to send data to a cache system. The prefetching hardware may be further configured to mark the plurality of other memory operation instructions with an incrementing count value from a counter.

DETAILED DESCRIPTION

Figure 1:
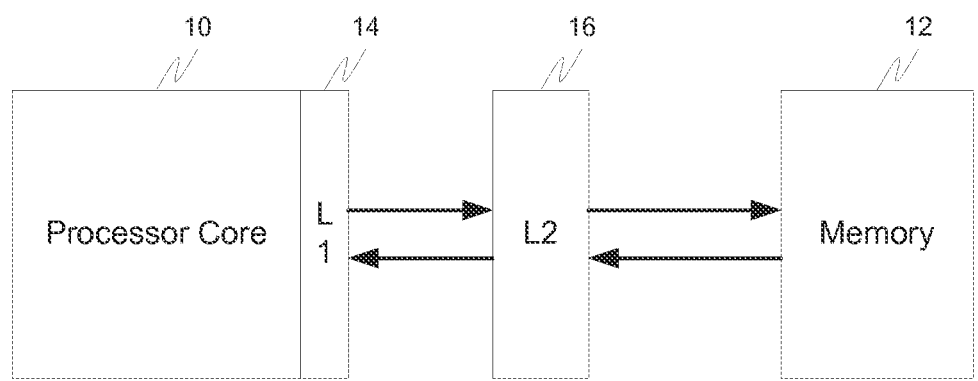
FIG. 1 is a block diagram depicting an example computing system.

FIG. 1 is a block diagram of an example computing system. The example computing system includes a processor core 10 for executing programming instructions and for accessing a memory system 12, among other things. The example computing system further includes a cache system comprising multiple levels of cache memory. In the example computing system, the cache system includes an L1 cache 14 that is close to the core 10 and an L2 cache 16 intermediate between the memory system 12 and the L1 cache 14.

Figure 2:
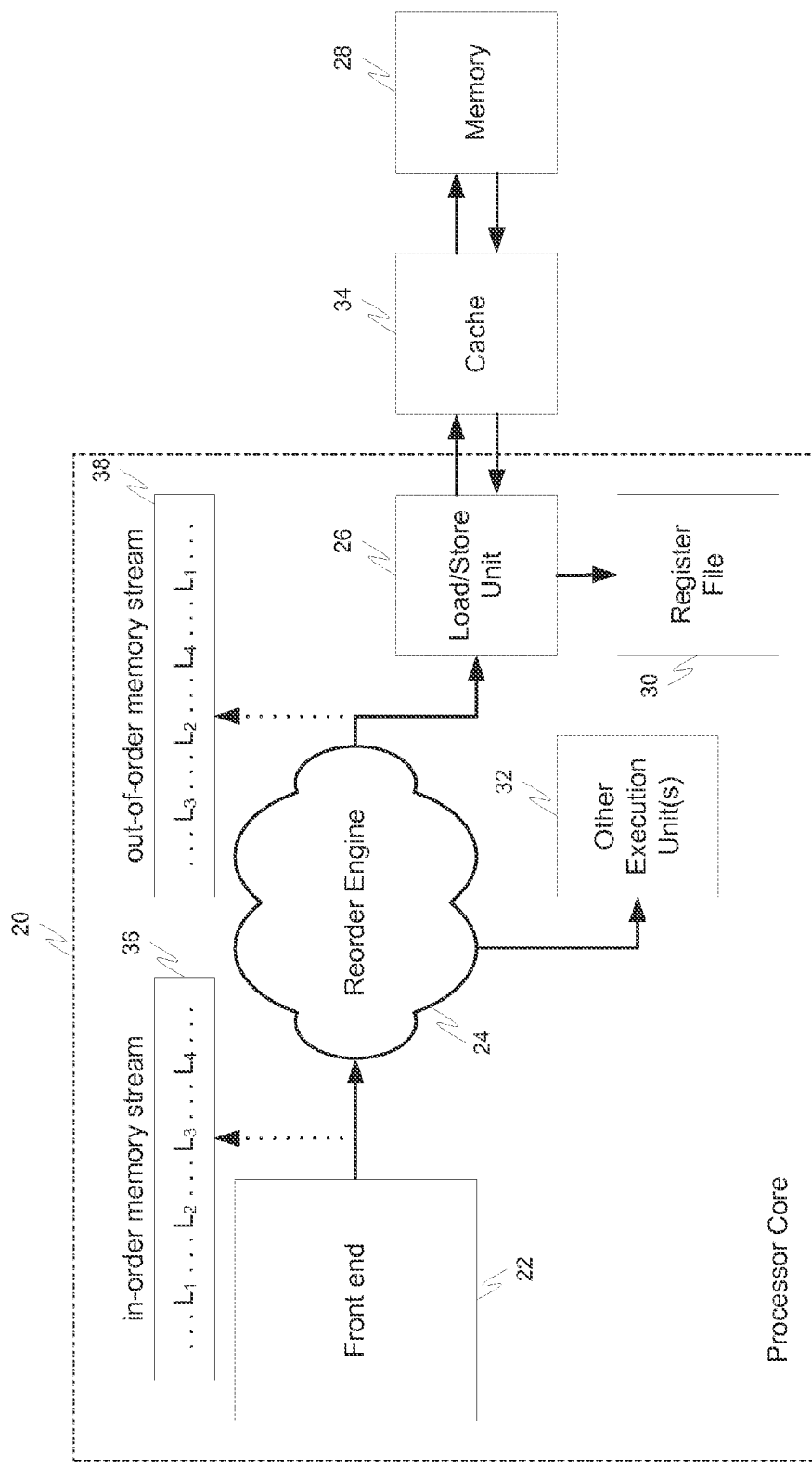
FIG. 2 is a block diagram depicting example components of a processor core.

FIG. 2 illustrates example components of a processor core 20 that has been enhanced to execute programming instructions out-of-order. The example processor core 20 includes a front end section 22 comprising various units such as an instruction fetch and instruction decode section (not shown) for fetching and decoding program instructions. The example processor core 20 further includes a reorder engine 24 for dispatching programming instructions to various execution units within the processor core for execution. The reorder engine may dispatch certain instructions to execution units out of program order, which may enhance the performance of the processor core 20. As an example, there may be an instruction that is subsequent in program order to a given instruction but does not depend on the given instruction. If execution of the given instruction is delayed for some reason, the later instruction may execute before the given instruction completes, which may improve overall performance.

One illustrated execution unit in FIG. 2 is the load store unit 26. The load store unit 26 is provided, among other things, to load data from the memory 28 to a register file 30 and to store data from the register file 30 to the memory 28. Other execution unit(s) 32 may perform operations on data in the register file 30 based on instructions dispatched from the reorder engine 24 after loading or before storing operations.

A cache system 34 is positioned intermediate between the memory 28 and the core 20. The cache system 34 includes one or more levels of cache memory for providing the core 20 with quicker access to data than can be provided by the memory 28. As an example, the access time for providing data from the memory 28 may be around 300 ns compared to around 5 ns for data stored in an L1 cache. Consequently, it is desirable for memory accesses to be satisfied from the cache 34 as much as possible instead of from the memory 28.

To ensure that the cache 34 contains data that may be requested by memory operation instructions, a prefetch system may be employed. The prefetch system predicts the memory location of data in main memory 28 that may be requested by memory operation instructions and issues instructions for that data to be loaded into the cache 34 prior to data being needed.

FIG. 2 also illustrates an example in-order memory stream 36 of program instructions that may be fetched and decoded by the core front end 22. In this example memory stream, the load memory operation instruction is depicted using the letter L. The load memory operation instructions are numbered relative to each other in the order in which they appear in the executing program, i.e., program order.

As an example, a memory stream may result from a program loop that causes the repeated performance of particular program instructions. An example program loop may contain a load memory operation instruction, a mathematical or logical instruction, a store instruction, and a branch back to loop instruction. In this example, the load memory operation instructions may iterate through the memory at regular intervals. Also, the load memory operation instructions in this example loop are part of the same memory stream. A memory stream may include a flow of data into or out of a processor that is well ordered or predictable.

FIG. 2 further illustrates an out-of-order memory stream 38 that may arise because the reorder engine 24 allows some program instructions to execute out of program order. This is illustrated in the example out-of-order memory stream 38, which, for example, shows that the load instruction designated L3 executes before the load instructions designated L1 and L2, even though load instructions L1 and L2 occur earlier in the program order.

Figure 3:
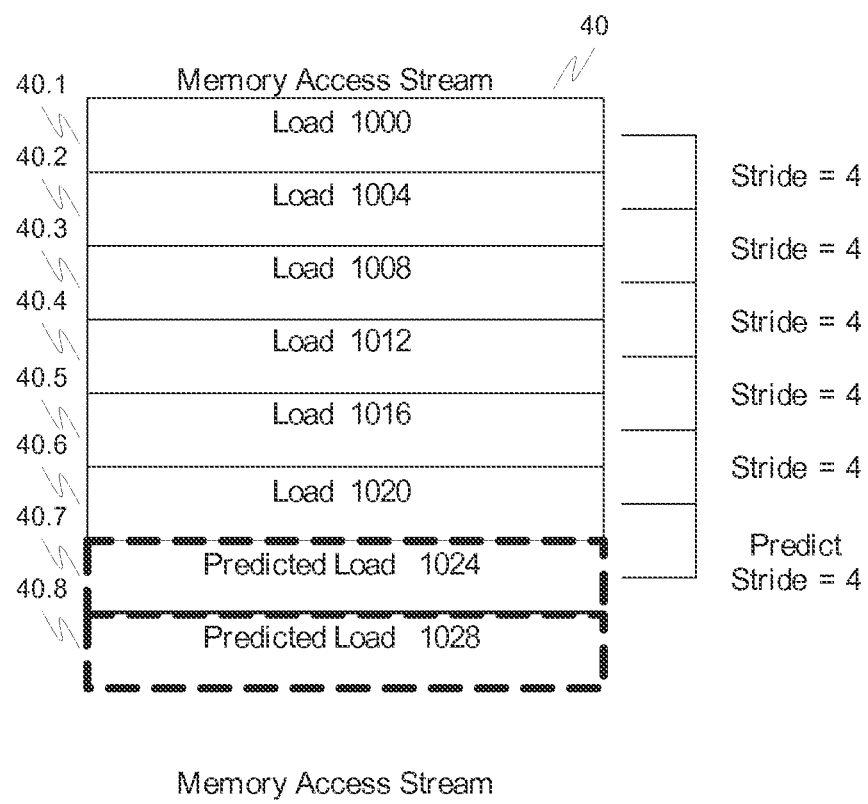
FIG. 3 is an example table containing entries corresponding to load instructions in an example memory access stream.

A stride detection algorithm may be implemented in a prefetch system to allow a microprocessor core to prefetch data to a cache before the data is needed. Depicted in FIG. 3 is an example table 40 containing entries (40.1-40.6) corresponding to load instructions in an example memory access stream. In this example memory access stream, the load instructions are executed in-order and the memory addresses associated with the data to be retrieved increment in a consistent pattern. For example, the first load instruction (entry 40.1) accesses data with an address equal to 1000 while the second load instruction (entry 40.2) accesses data with an address equal to 1004. The difference between these two addresses, i.e., the stride, is equal to 4. This pattern is shown to repeat for six entries (entries 40.1-40.6) and, consequently, a stride detection algorithm could predict, based on the six executed load instructions, a stride of 4 for subsequent load instructions in the same memory stream that have not yet been submitted for execution. Thus, the predicted memory address for a future load instruction would be 4 more than the address of the data accessed by the previous load instruction. Using this information, the data at predicted memory addresses may be prefetched and stored in a cache prior to load instructions being submitted for execution to allow the load instructions to retrieve data from cache instead of memory thereby improving the data access rate.

Figure 4:
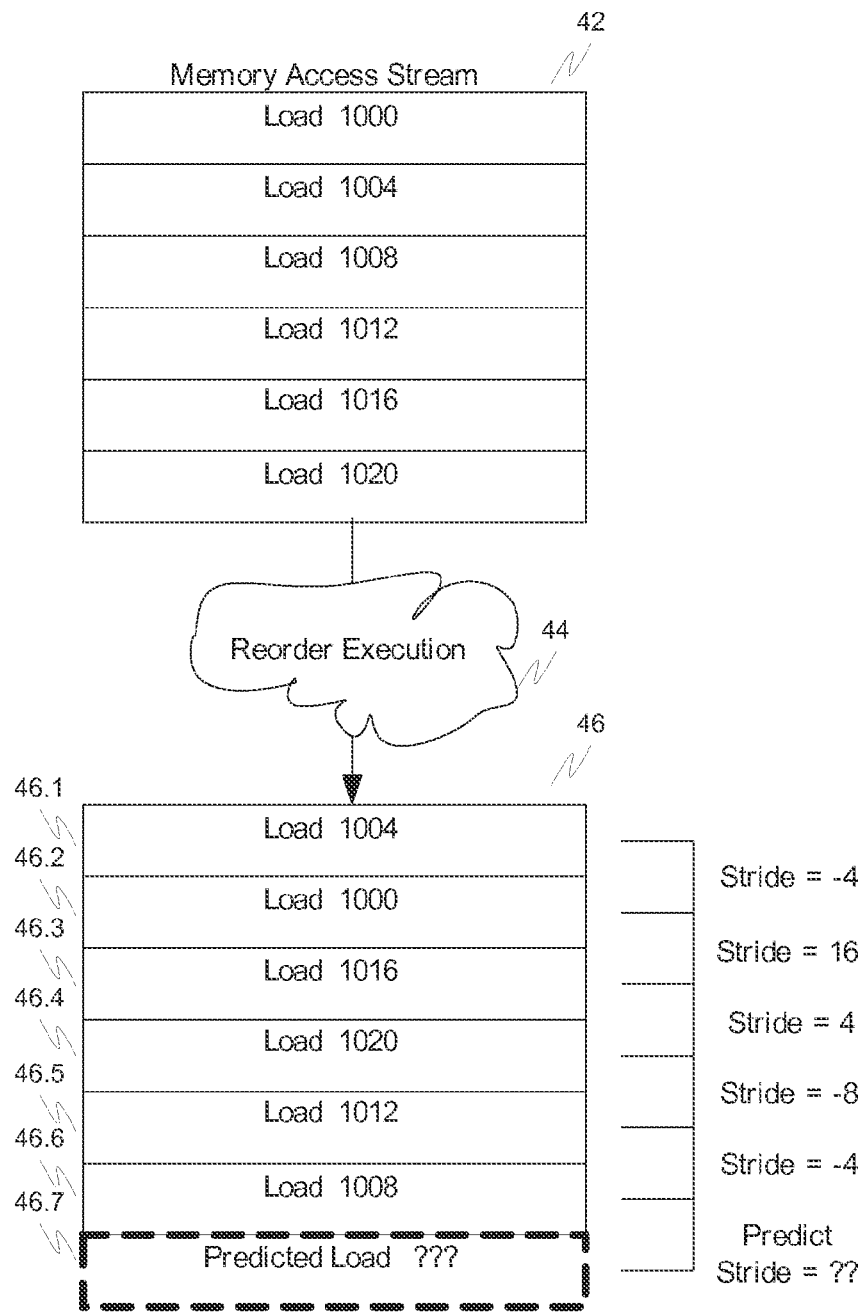
FIG. 4 is a process flow diagram depicting difficulties in predicting a consistent stride value when memory operation instructions are executed out-of-order.

When out-of-order instructions are allowed in a core, a stride detection algorithm that simply considers the stride between successive load instructions may have difficulties. This is illustrated in the example of FIG. 4. In this example, table 42 contains entries, in program order, corresponding to load instructions in an example memory access stream and the memory addresses for the data to be retrieved by the load instructions. The execution order for some of the load instructions may be reordered (operation 44) resulting in an out-of-order memory access stream illustrated by table 46. If a stride detection algorithm were simply to consider the stride between successive entries in the table, it would have difficulty predicting a stride, since the stride between successive entries varies. For example, the stride between entries 46.1 and 46.2 is −4, the stride between entries 46.2 and 46.3 is 16, the stride between entries 46.3 and 46.4 is 4, the stride between entries 46.4 and 46.5 is −8, and the stride between entries 46.5 and 46.6 is −4. A good estimate of the address for a subsequent load instruction cannot be determined based on this information alone.

Figure 5:
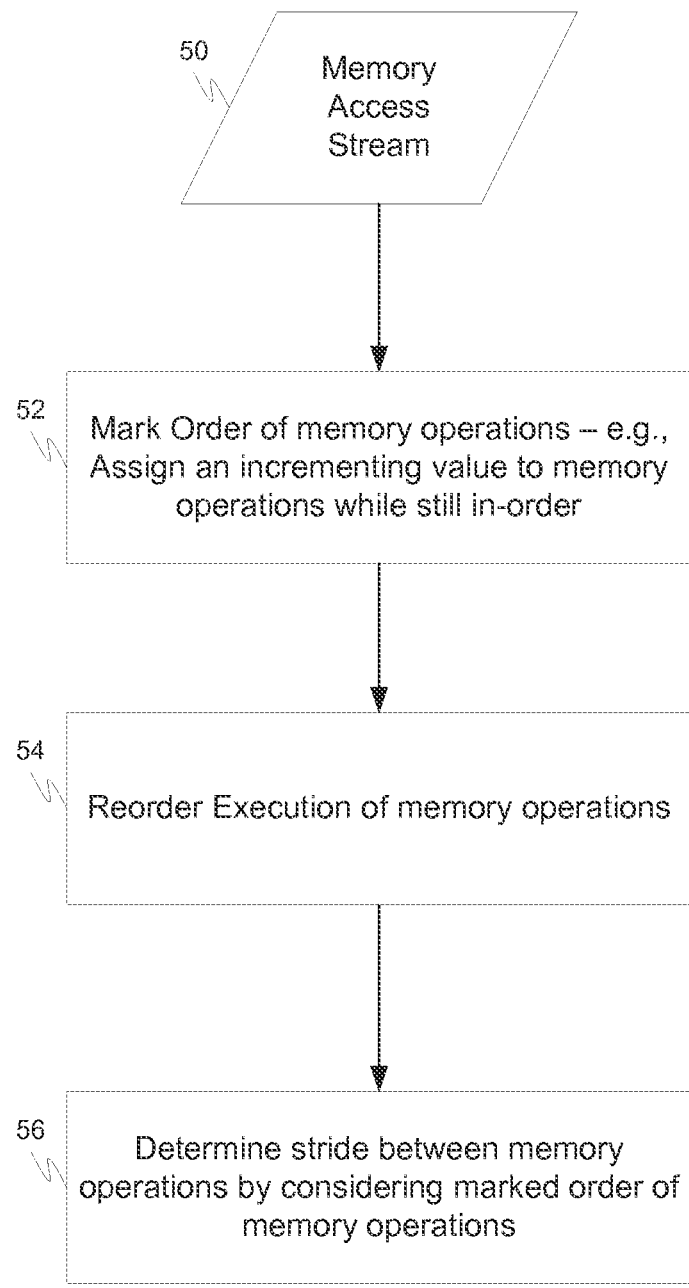
FIG. 5 is a process flow chart depicting an example method for detecting the stride of a stream of memory operations in an out of order execution pipe.

FIG. 5 is a process flow chart depicting an example process performed in a processor core for determining the stride between memory operations in a core in which instructions may be executed out of order. A memory access stream (50) is evaluated. Memory operation instructions (such as a load instruction) in the memory access stream are marked with an indication of their order while they are still in-order in the instruction pipe (operation 52). This may be accomplished, for example by assigning an incrementing value to the memory operation instructions. The memory operation instructions may then have their execution order reordered (operation 54). The stride between memory operation instructions may be determined after the memory operation instructions are submitted for execution by considering the marked order of the memory operation instructions (operation 56).

Figure 6:
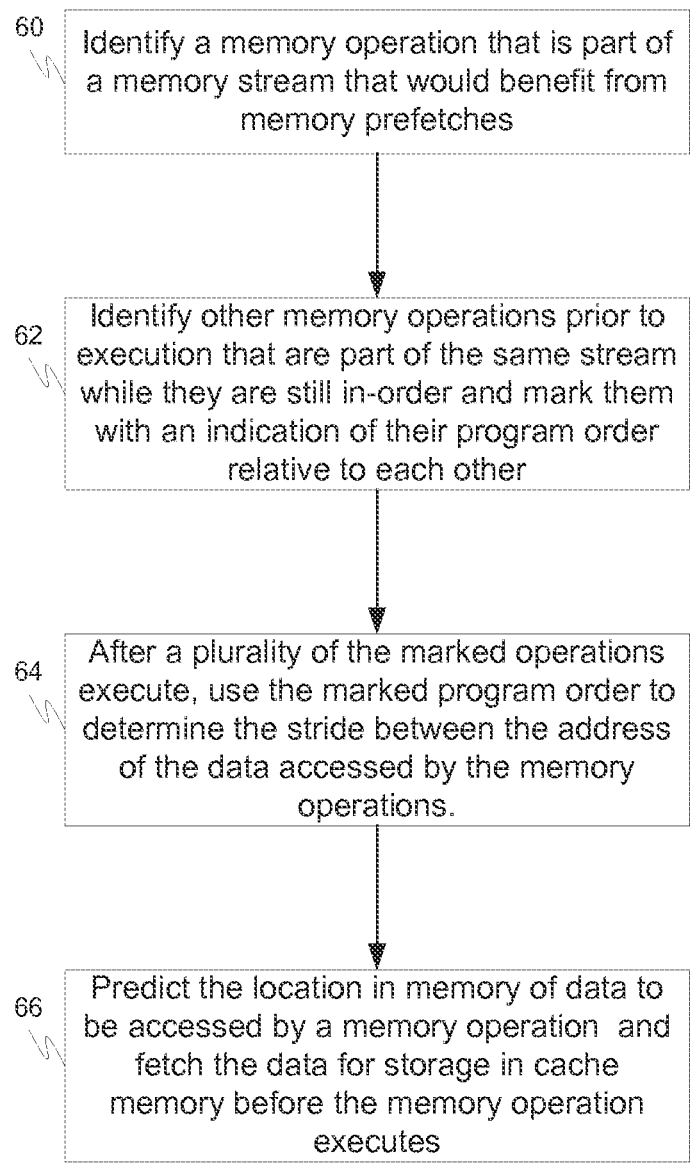
FIG. 6 is a process flow chart depicting another example method for detecting the stride of a stream of memory operations in an out of order execution pipe.

FIG. 6 is a process flow chart depicting another example process for determining the stride between memory operation instructions. A memory operation that is part of a memory stream that would benefit from memory prefetches is identified (operation 60). Other memory operations that are part of the same memory stream while they are still in-order are identified and marked with an indication of their program order relative to each other (operation 62). After a plurality of the marked operations execute, the marked program order can be used to determine the stride between the address of data accessed by the memory operations (operation 64). The location in memory of data to be accessed by subsequent memory operations can be predicted and the data fetched for storage in cache memory before the subsequent memory operations execute (operation 66).

Figure 7:
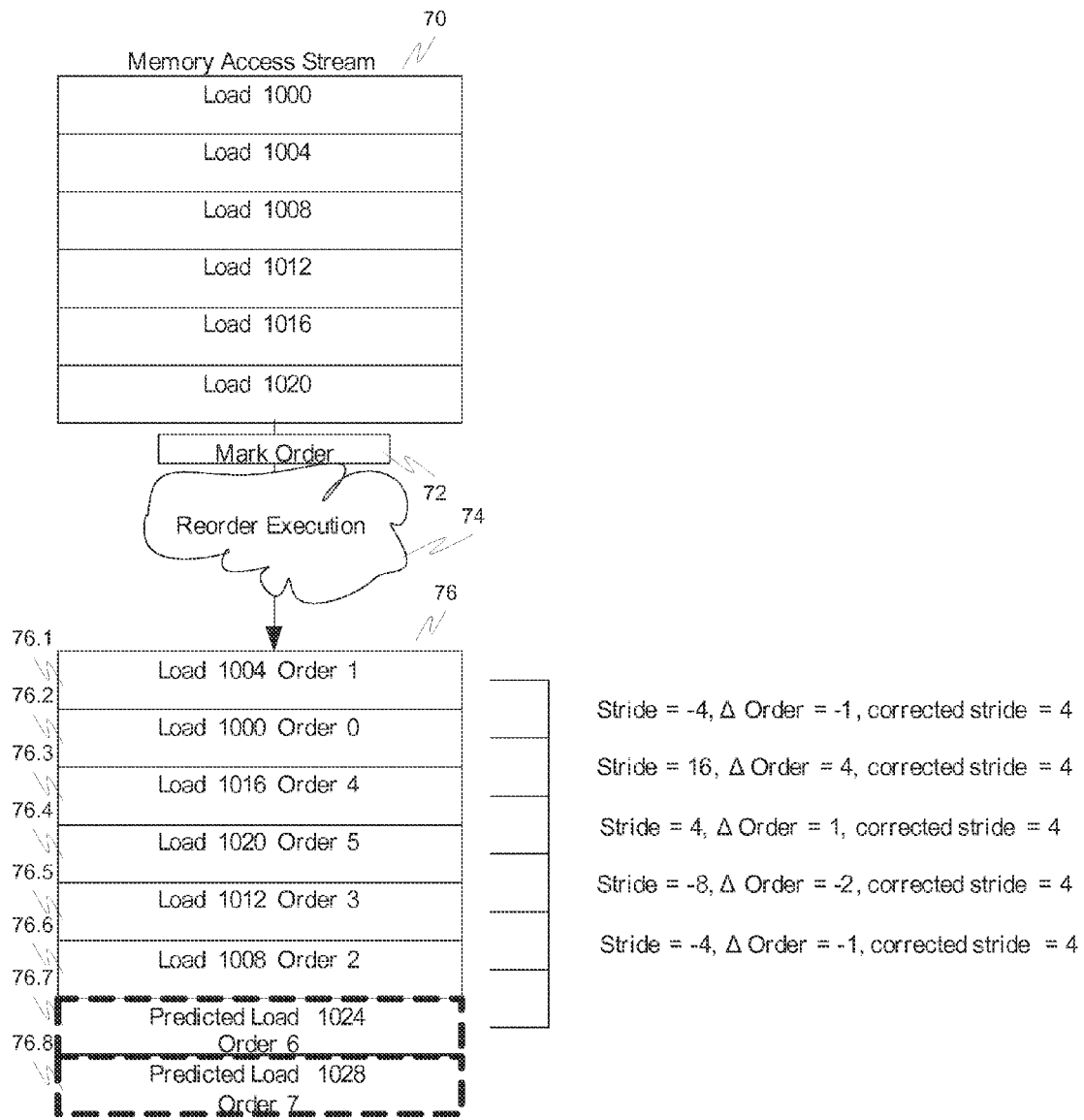
FIG. 7 is a process flow diagram depicting the calculation of a corrected stride.

Depicted in FIG. 7 is a process flow diagram of an example system for predicting the stride when memory operations can be executed out-of-order. In this example, table 70 contains entries, in program order, corresponding to load instructions in an example memory access stream and the memory addresses for the data to be retrieved by the load instructions. The order of the load instructions depicted in table 70 are marked (operation 72) while they are still in-order. The execution order for some of the load instructions may be reordered (operation 74) resulting in an out-of-order memory access stream illustrated by table 76. If a stride detection algorithm were simply to consider the stride between successive entries in the table, it would have difficulty predicting a stride, since the stride between successive entries varies. For example, the stride between entries 76.1 and 76.2 is −4, the stride between entries 76.2 and 76.3 is 16, the stride between entries 76.3 and 76.4 is 4, the stride between entries 76.4 and 76.5 is −8, and the stride between entries 76.5 and 76.6 is −4. A good estimate of the address for a subsequent load instruction cannot be determined on this information alone. Since the load instructions shown in Table 76 have been marked with their order, a corrected stride for the load instructions in the memory stream may be determined. For example, by dividing the original stride calculation by the delta change in order between entries, a corrected stride can be determined. As illustrated, the correct stride in this example is 4 from entry to entry. The corrected stride can then be used to provide a good estimate of the address for a subsequent load instruction as illustrated at entries 76.7 and 76.8.

Figure 8:
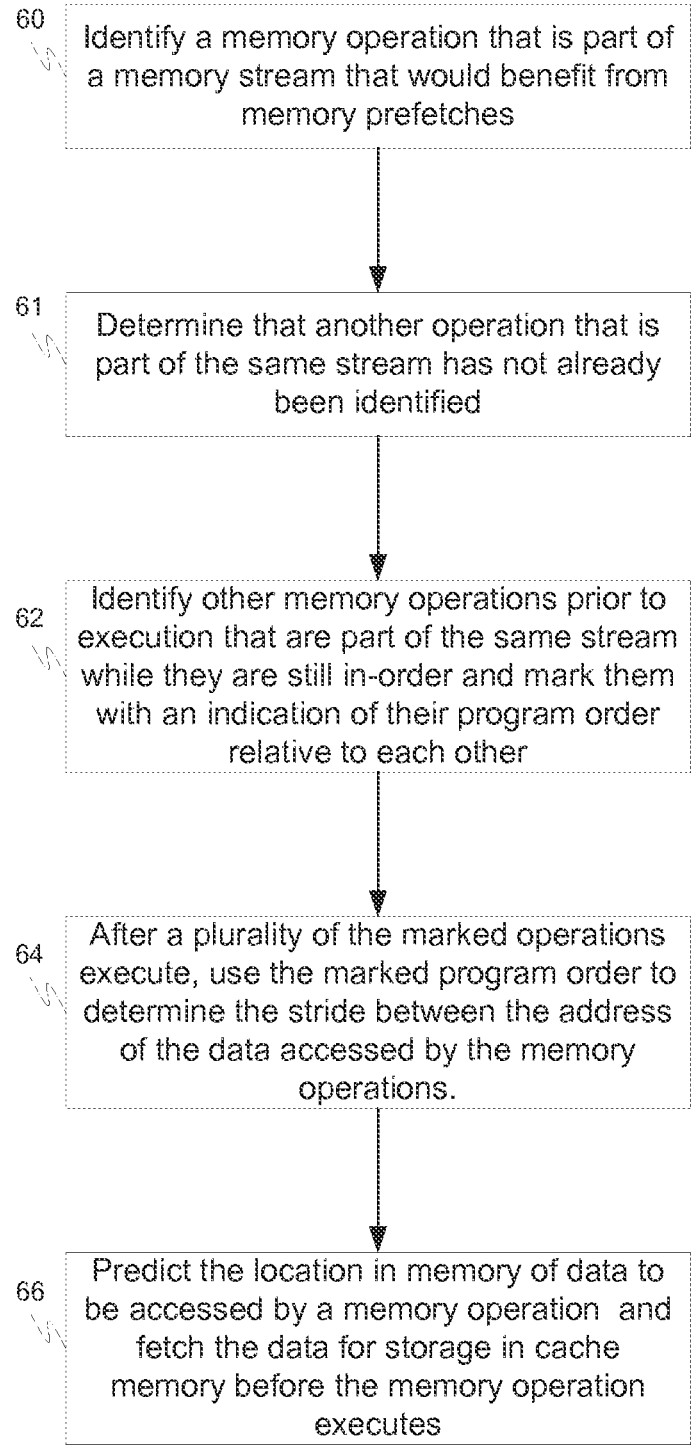
FIG. 8 is a process flow chart that depicts an example process for detecting the stride of a stream of memory operations in an out of order execution pipe.

FIG. 8 is a process flow chart depicting another example process for determining the stride between memory operation instructions. A memory operation instruction that is part of a memory stream that would benefit from memory prefetches is identified (operation 60). A check would be made to determine that another memory operation instruction that is already part of the same stream has not already been identified (operation 61). Next, other memory operation instructions that are part of the same memory stream while they are still in-order are identified and marked with an indication of their program order relative to each other (operation 62). After a plurality of the marked memory operation instructions execute, the marked program order can be used to determine the stride between the address of data accessed by the memory operation instructions (operation 64). The location in memory of data to be accessed by subsequent memory operation instructions can be predicted and the data fetched for storage in cache memory before the subsequent memory operation instructions execute (operation 66).

Figure 9:
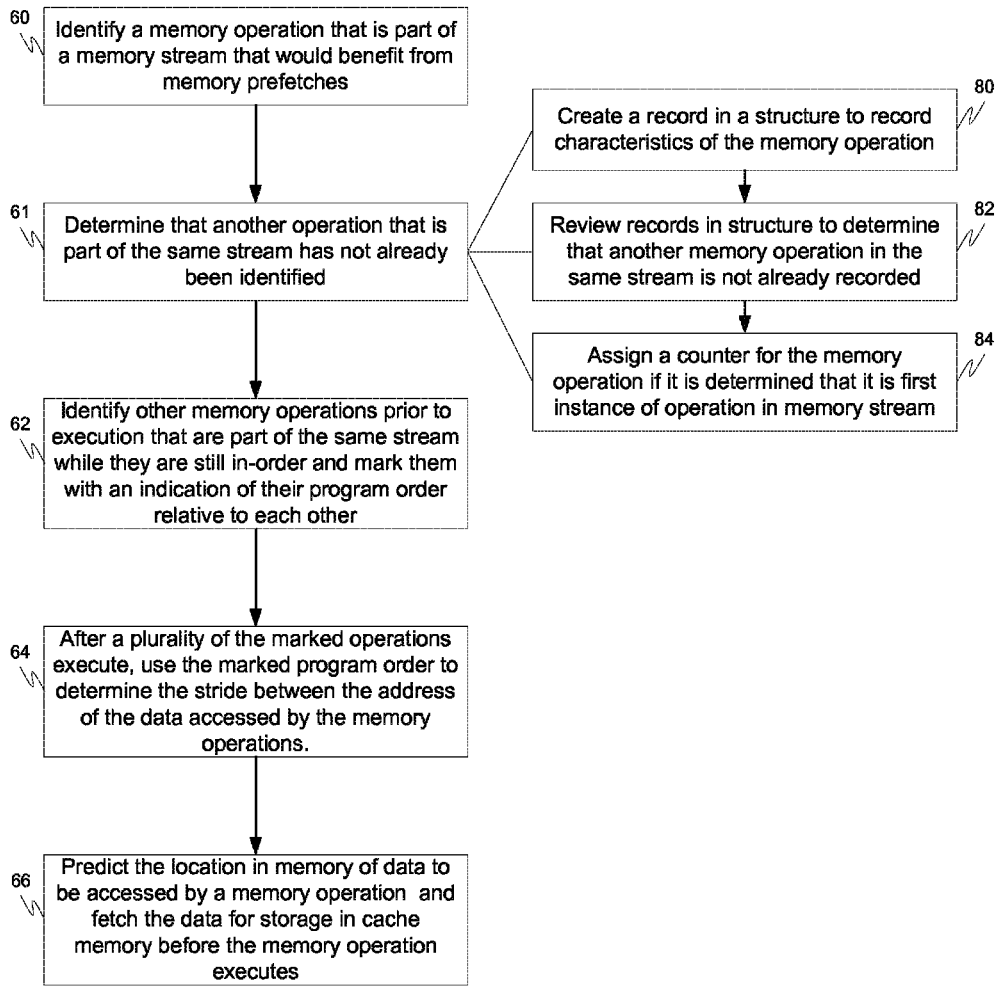
FIG. 9 is a process flow chart that depicts another example process for detecting the stride of a stream of memory operations in an out of order execution pipe.

FIG. 9 is another process flow chart depicting an example process for determining the stride between memory operation instructions. A memory operation instruction that is part of a memory stream that would benefit from memory prefetches is identified (operation 60). A check would be made to determine that another memory operation instruction that is already part of the same stream has not already been identified (operation 61). This check includes creating a record in a structure (such as a register file) to record characteristics of the memory operation instruction (operation 80). The check further includes reviewing records in the structure to determine that another memory operation instruction in the same stream is not already recorded (operation 82). The check also includes assigning a counter for the memory operation instruction, but only if it is determined that the memory operation instruction is the first instance of the memory operation instruction in the memory stream (operation 84).

After determining that another memory operation instruction that is part of the same stream has not already been identified, other memory operation instructions that are part of the same memory stream while they are still in-order are identified and marked with an indication of their program order relative to each other (operation 62). After a plurality of the marked memory operation instructions execute, the marked program order can be used to determine the stride between the address of data accessed by the memory operation instructions (operation 64). The location in memory of data to be accessed by subsequent memory operation instructions can be predicted and the data fetched for storage in cache memory before the subsequent memory operation instructions execute (operation 66).

Figure 10:
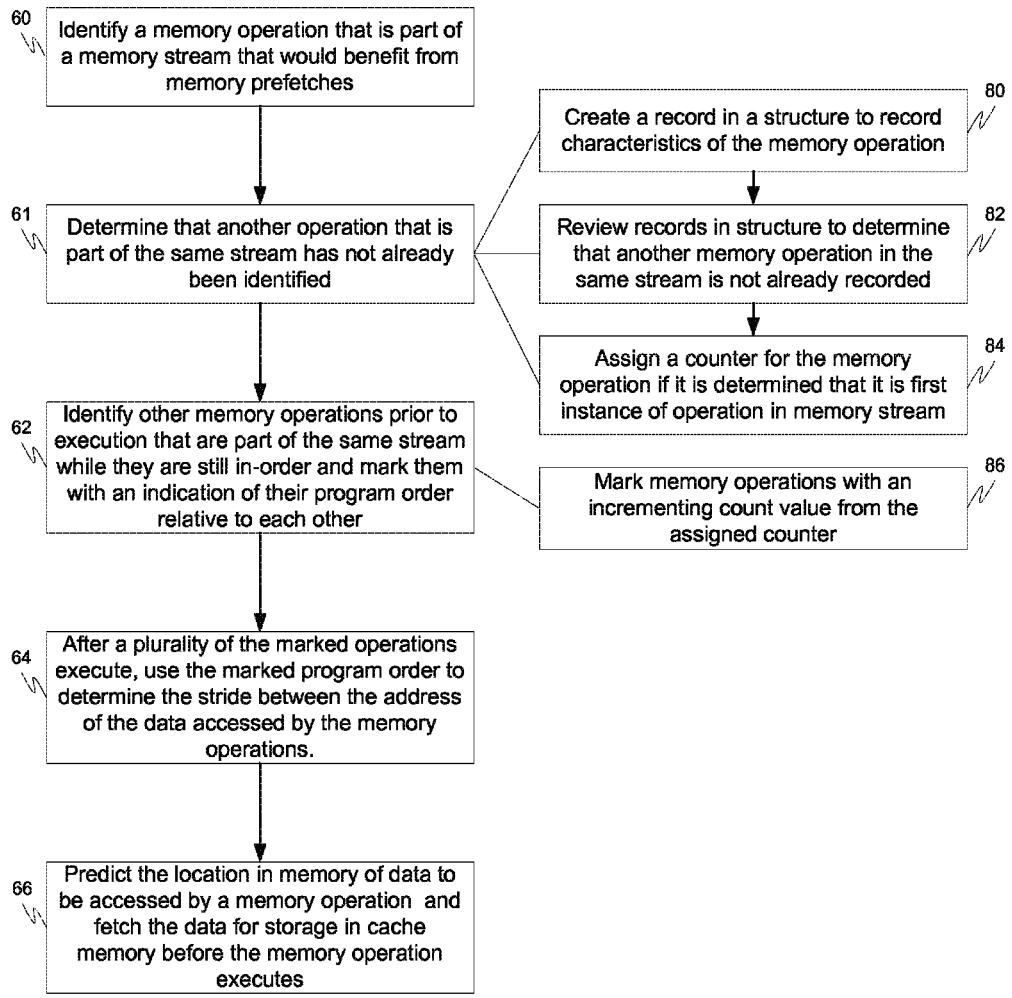
FIG. 10 is a process flow chart that depicts yet another example process for detecting the stride of a stream of memory operations in an out of order execution pipe.

FIG. 10 is a process flow chart depicting another example process for determining the stride between memory operation instructions. A memory operation instruction that is part of a memory stream that would benefit from memory prefetches is identified (operation 60). A check would be made to determine that another memory operation instruction that is already part of the same stream has not already been identified (operation 61). This check includes creating a record in a structure (such as a register file) to record characteristics of the memory operation instruction (operation 80). The check further includes reviewing records in the structure to determine that another memory operation instruction in the same stream is not already recorded (operation 82). The check also includes assigning a counter for the memory operation instruction, but only if it is determined that the memory operation instruction is the first instance of the memory operation instruction in the memory stream (operation 84).

After determining that another memory operation instruction that is part of the same stream has not already been identified, other memory operation instructions that are part of the same memory stream while they are still in-order are identified and marked with an indication of their program order relative to each other (operation 62). The marking in this example includes marking memory operation instructions with an incrementing count value from the assigned counter (operation 86).

After a plurality of the memory operation instructions execute, the marked program order can be used to determine the stride between the address of data accessed by the memory operation instructions (operation 64). The location in memory of data to be accessed by subsequent memory operation instructions can be predicted and the data fetched for storage in cache memory before the subsequent memory operation instructions execute (operation 66).

Figure 11:
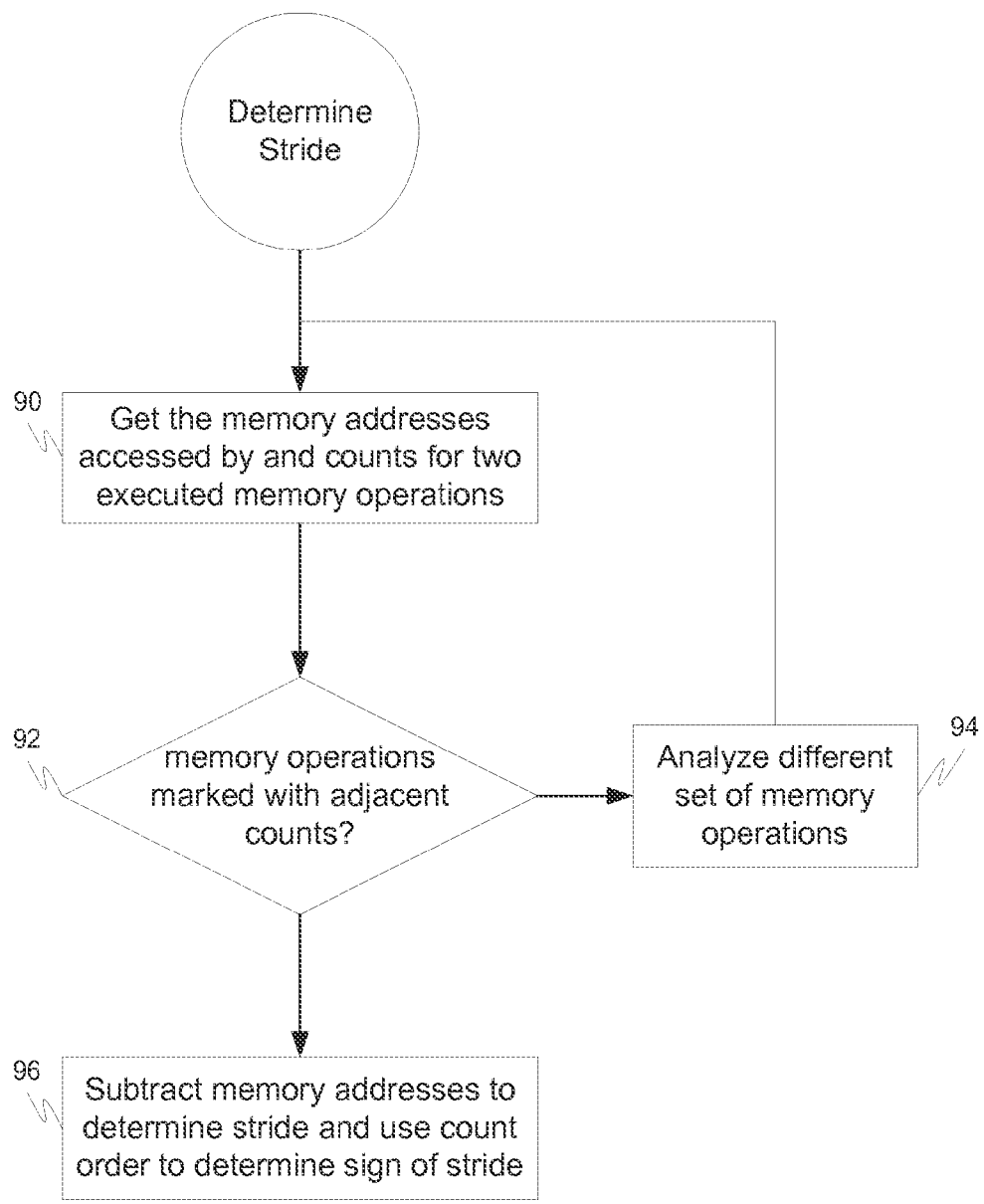
FIG. 11 is a process flow chart that depicts an example process for calculating the stride of a stream of memory operations in an out of order execution pipe.

FIG. 11 is a process flow chart depicting an example process for calculating the stride between the memory addresses accessed by two marked instructions that have executed. A memory address and a count value associated with each of the two executed memory operation instructions are retrieved (operation 90). The memory address of one of the two executed memory operation instructions is subtracted from the other if the two executed memory operation instructions are marked as having been in consecutive program order (operation 96). If the two executed memory operation instructions are not marked as having been in consecutive program order then a different set of memory operation instructions is used in the calculation (operation 94).

Figure 12:
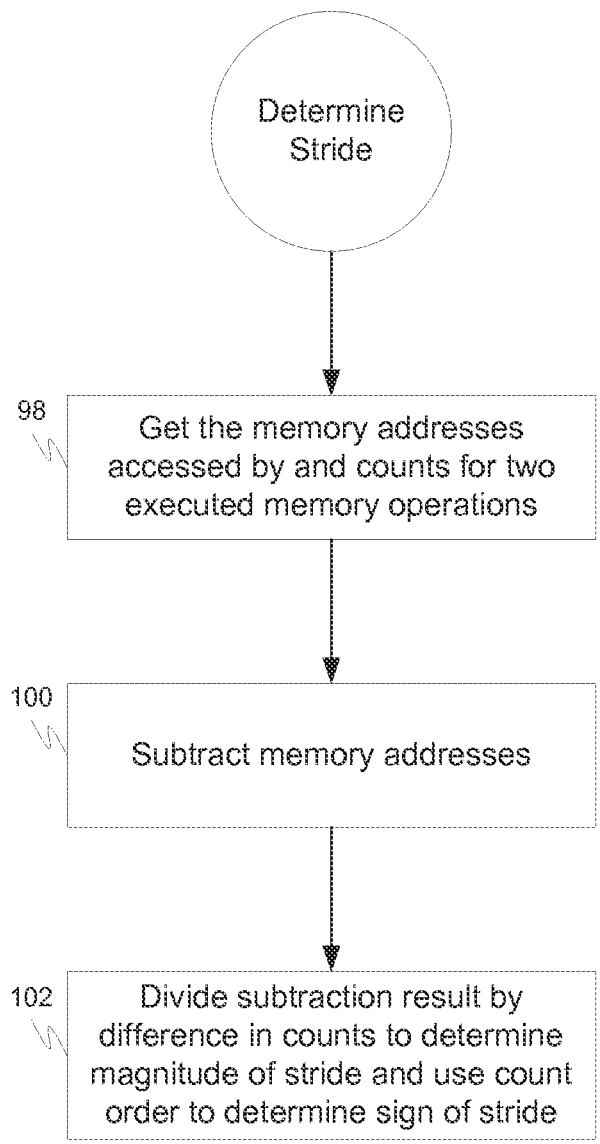
FIG. 12 is a process flow chart that depicts another example process for calculating the stride of a stream of memory operations in an out of order execution pipe.

FIG. 12 is a process flow chart depicting another example process for calculating the stride between the memory addresses accessed by two marked instructions that have executed. A memory address and a count value associated with each of the two executed memory operation instructions are retrieved (operation 98). The memory address of one of the two executed memory operation instructions is subtracted from the other (operation 100). The subtraction result is divided by the program order difference between the two executed memory operation instructions (operation 102).

Figure 13:
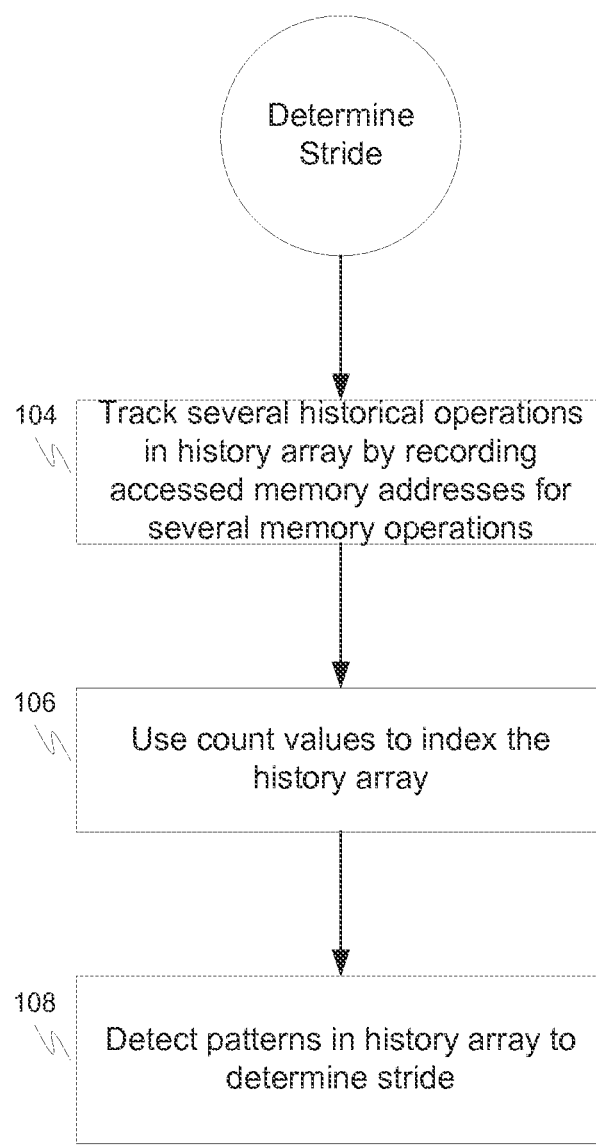
FIG. 13 is a process flow chart for depicting yet another example process for calculating the stride of a stream of memory operations in an out of order execution pipe.

FIG. 13 is a process flow chart depicting an additional example process for calculating the stride between the memory addresses accessed by several marked instructions that have executed. Several historical operations are tracked in a history array by recording accessed memory addresses for several memory operations (operation 104). The history array is indexed using count values (operation 106). Patterns in the history array are detected (operation 108).

Figure 14:
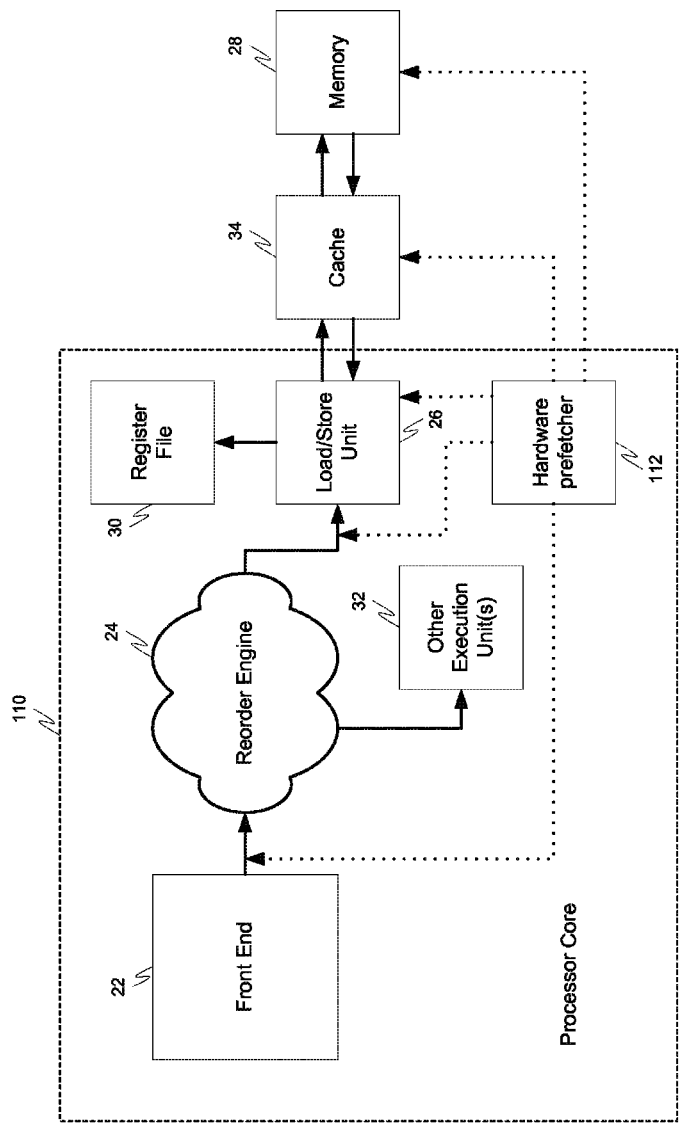
FIG. 14 is a block diagram of an example computing system that includes a hardware prefetcher.

FIG. 14 illustrates example components of a processor core 110 that has been enhanced to execute programming instructions out-of-order and that includes a hardware prefetcher 112 that can predict future memory addresses for prefetching data for storage in the cache 34 prior to the data being requested by the core 110. Similar to the example system of FIG. 2, the example processor core 110 of FIG. 14 has been enhanced to execute programming instructions out-of-order. The example processor core 110 includes a front end section 22 comprising various units such as an instruction fetch and instruction decode section (not shown) for fetching and decoding program instructions. The example processor core 110 further includes a reorder engine 24 for dispatching programming instructions to various execution units within the processor core for execution. The reorder engine may dispatch certain instructions to execution units out of program order, which may enhance the performance of the processor core 110. The example processor core 110 further includes a load store unit 26. The load store unit 26 is provided, among other things, to load data from the memory 28 to a register file 30 and to store data from the register file 30 to the memory 28. Other execution unit(s) 32 may perform operations on data in the register file 30 based on instructions dispatched from the reorder engine 24 after loading or before storing operations. A cache system 34 is positioned intermediate between the memory 28 and the core 110. The cache system 34 includes one or more levels of cache memory for providing the core 110 with quicker access to data than can be provided by the memory 28.

To ensure that the cache 34 contains data that may be requested by memory operation instructions, a hardware prefetch system 112 is employed. The prefetch system 112 predicts the memory location of data in main memory 28 that may be requested by memory operation instructions and issues instructions for that data to be loaded into the cache 34 prior to data being needed. The hardware prefetcher 112 may be configured to detect the stride of a stream of memory operations using any of the methods described in this disclosure.

A system with a highly regular memory stream may benefit from the methods described herein. A system with a highly regular memory stream may not have to endure the delay of a cache miss due to the methods described herein. The methods described herein may also allow for beyond next line prefetch capability. Methods described herein may allow for the prediction of the data location for multiple memory accesses and allow for the prefetching of data for multiple load commands well in advance of the execution of the load commands. Additionally, the methods described herein may allow for the number of load commands in advance for which prefetching is performed to be configurable.

The patentable scope of the described subject matter may include other examples. Additionally, the methods and systems described herein may be implemented with many different types of processing devices.

It should be understood that the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method comprising:
    receiving memory operation instructions that are in program order;
    marking each instruction of the memory operation instructions with a program-order position value, wherein the program-order position value indicates a position of the instruction relative to program order;
    reordering the memory operation instructions into a rearranged order that differs from the program order,
    executing, in the rearranged order, initial instructions from among the reordered instructions, with the executed initial instructions followed by an unexecuted subsequent instruction from among the reordered instructions;
    detecting a stride in variation of memory addresses accessed by the executed initial instructions with respect to variation of the program-order position values of the executed initial instructions, by:
        determining, for each pair of multiple pairs of the instructions from among the executed initial instructions, a preliminary stride for the respective pair of instructions, wherein, for each pair, the preliminary stride corresponds to (i) a difference between the memory addresses accessed by the respective pair of instructions divided by (ii) a difference between the program-order position values of the respective pair of instructions, wherein the difference between the program-order position values of at least one of the pairs does not equal one; and
        in response to determining that the preliminary offset values are equal to a common value, designating the common value as the stride;
    predicting an address for the unexecuted subsequent instruction based on (i) the detected stride and (ii) the program-order position value of the unexecuted subsequent instruction; and
    prefetching data from the predicted address for the subsequent instruction prior to execution of the subsequent instruction.

2. The method of claim 1, wherein the predicted address is a first predicted address, and wherein the unexecuted subsequent instruction is a first unexecuted subsequent instruction, and wherein the reordered memory operation instructions include a second unexecuted subsequent instruction, and wherein the method further comprises:
    before the prefetching of data from the first predicted address, predicting a second address from which to prefetch data for the second unexecuted subsequent instruction based on the detected stride; and
    after the prefetching of data from the first predicted address, prefetching data from the second predicted address.

3. The method of claim 1, wherein the marking of the program-order position values is performed before the executing of the initial instructions.

4. The method of claim 1, wherein the prefetching of the data includes storing the prefetched data in cache memory.

5. The method of claim 1, performed in an order defined by: the marking, the reordering, the executing, the detecting, the predicting and the prefetching.

6. The method of claim 1, wherein at least one of the multiple pairs includes a first instruction and a second instruction, with the second instruction being later than the first instruction with respect to program order but being executed before the first instruction.

7. A core processor configured to:
    receive memory operation instructions that are in program order;
    mark each instruction of the memory operation instructions with a program-order position value, wherein the program-order position value indicates a position of the instruction relative to program order;
    reorder the memory operation instructions into a rearranged order that differs from the program order,
    execute, in the rearranged order, initial instructions from among the reordered instructions, with the executed initial instructions followed by an unexecuted subsequent instruction from among the reordered instructions;
    detect a stride in variation of memory addresses accessed by the executed initial instructions with respect to variation of the program-order position values of the executed initial instructions, by:
        determining, for each pair of multiple pairs of the instructions from among the executed initial instructions, a preliminary stride for the respective pair of instructions, wherein, for each pair, the preliminary stride corresponds to (i) a difference between the memory addresses accessed by the respective pair of instructions divided by (ii) a difference between the program-order position values of the respective pair of instructions, wherein the difference between the program-order position values of at least one of the pairs does not equal one; and in response to determining that the preliminary offset values are equal to a common value, designating the common value as the stride;

predict an address for the unexecuted subsequent instruction based on (i) the detected stride and (ii) the program-order position value of the unexecuted subsequent instruction; and prefetch data from the predicted address for the subsequent instruction prior to execution of the subsequent instruction.

8. The core processor of claim 7, wherein the predicted address is a first predicted address, and wherein the unexecuted subsequent instruction is a first unexecuted subsequent instruction, and wherein the reordered memory operation instructions include a second unexecuted subsequent instruction, and wherein the core processor is further configured to:

before the prefetching of data from the first predicted address, predicting a second address from which to prefetch data for the second unexecuted subsequent instruction based on the detected stride; and after the prefetching of data from the first predicted address, prefetch data from the second predicted address.

9. The core processor of claim 7, wherein the marking of the program-order position values is performed before the executing of the initial instructions.

10. The core processor of claim 7, wherein the prefetching of the data includes storing the prefetched data in cache memory.

11. The core processor of claim 7, performed in an order defined by: the marking, the reordering, the executing, the detecting, the predicting and the prefetching.

12. The core processor of claim 7, wherein at least one of the multiple pairs includes a first instruction and a second instruction, with the second instruction being later than the first instruction with respect to program order but being executed before the first instruction.

13. A method comprising the following steps performed in the following order:

receiving memory operation instructions that are in program order;

marking each instruction of the memory operation instructions with a program-order position value, wherein the program-order position value indicates a position of the instruction relative to program order;

reordering the memory operation instructions into a rearranged order that differs from the program order;

executing, in the rearranged order, initial instructions from among the reordered instructions, with the executed initial instructions followed by an unexecuted subsequent instruction from among the reordered instructions;

detecting a pattern in variation of memory addresses accessed by the executed initial instructions with respect to variation of the program-order position values of the executed initial instructions;

predicting an address for the unexecuted subsequent instruction based on the detected pattern; and prefetching data from the predicted address for the subsequent instruction prior to execution of the subsequent instruction.

* * * * *